US008553063B2

(12) United States Patent
Maeng et al.

(10) Patent No.: US 8,553,063 B2
(45) Date of Patent: Oct. 8, 2013

(54) APPARATUS AND METHOD FOR CONFIGURING HIGH-DEFINITION VIDEO TELEPHONY BETWEEN COMPUTER DEVICES

(75) Inventors: Je-Young Maeng, Suwon-si (KR); Jun-Hyung Kim, Suwon-si (KR); Ho-Yeon Park, Seoul (KR); Se-Hee Han, Seoul (KR)

(73) Assignee: Samsung Electronics Co., Ltd (KR)

( * ) Notice: Subject to any disclaimer, the term of this patent is extended or adjusted under 35 U.S.C. 154(b) by 265 days.

(21) Appl. No.: 13/182,804

(22) Filed: Jul. 14, 2011

(65) Prior Publication Data
US 2012/0013703 A1    Jan. 19, 2012

(30) Foreign Application Priority Data

Jul. 14, 2010  (KR) .................. 10-2010-0068134
Jan. 17, 2011  (KR) .................. 10-2011-0004673
Jul. 13, 2011  (KR) .................. 10-2011-0069653

(51) Int. Cl.
*H04N 7/14*         (2006.01)
(52) U.S. Cl.
CPC ...................................... *H04N 7/14* (2013.01)
USPC .................. 348/14.02; 348/14.01; 348/14.12

(58) Field of Classification Search
CPC ................................... H04N 7/14; H04N 7/15
USPC .................. 348/13.01–14.16; 370/260–261; 709/204, 223
See application file for complete search history.

(56) References Cited

U.S. PATENT DOCUMENTS

| 2005/0020268 | A1 | 1/2005 | Hosie et al. |
| 2007/0093248 | A1 | 4/2007 | Gelderblom |
| 2007/0198669 | A1* | 8/2007 | Convertino et al. .......... 709/220 |
| 2009/0119725 | A1 | 5/2009 | Park et al. |
| 2010/0066804 | A1* | 3/2010 | Shoemake et al. ......... 348/14.02 |

FOREIGN PATENT DOCUMENTS

WO    WO 00/79813    12/2000

* cited by examiner

*Primary Examiner* — Melur Ramakrishnaiah
(74) *Attorney, Agent, or Firm* — The Farrell Law Firm, P.C.

(57) ABSTRACT

An apparatus for configuring a high-definition (HD) call connection between computer devices includes a Short Messaging Service (SMS) transceiving module for receiving a message for requesting home network telephony device list information of a first device, discovering a device in the home network to generate the telephony device list information, transmitting response message comprising the generated telephony device list information to the first device, receiving an SMS call connection request message from the first device, and transmitting an SMS call connection response message to the first device, and a Control Point (CP) for selecting a telephony device for receiving and initiating the call.

14 Claims, 10 Drawing Sheets

APPARATUS AND METHOD FOR CONFIGURING HIGH-DEFINITION VIDEO TELEPHONY BETWEEN COMPUTER DEVICES

PRIORITY

This application claims priority under 35 U.S.C. §119(a) to Korean Patent Applications filed in the Korean Intellectual Property Office on Jul. 14, 2010 and assigned Serial No. 10-2010-0068134, on Jan. 17, 2011 and assigned Serial No. 10-2011-0004673 and on Jul. 13, 2011 and assigned Serial No. 10-2011-0069653, the contents of which are incorporated herein by reference.

BACKGROUND OF THE INVENTION

1. Field of the Invention

The present invention relates generally to an apparatus and method for configuring telephony, and more particularly, to an apparatus and method for configuring High-Definition (HD) video telephony between computer devices.

2. Description of the Related Art

The development of mobile networks and portable terminals has led to the decrease of cellular phone communication fees, resulting in the rapid growth of the cell phone market.

Additional services other than voice communication have also been developed, which has led to the current era of video communication.

Use for such a mobile service has expanded in scope to in-home, and techniques such as Universal Plug and Play Telephony (UPnP) allowing use of cell phone functions by using a Computer Engineering (CE) device such as a TeleVision (TV) in premises, have emerged.

The UPnP telephony is a technique for interworking the CE device with a telephony device, with which technique a user can send or receive a call by using the TV in the house, regardless of a type of the telephony device.

The UPnP telephony is advantageous in that it can be used by interworking with not only a mobile telephony service, but also an existing telephony technique such as Voice over Internet Protocol (VoIP) and Public Switched Telephone Network (PSTN). In addition, since the UPnP telephony also has the same UPnP device architecture as the Digital Living Network Alliance (DLNA), which is a standard for media sharing in the premises, it is likely to be adopted as a next-generation standard of the DLNA.

Techniques for covering similar areas to the UPnP telephony include Session Initiation Protocol (SIP)-based Gm* which is under standardization in Telecommunications and Internet converged Services and Protocols for Advanced Networking (TISPAN) and Cordless Advanced Technology—internet and quality (CAT-iq) for premises cordless phone connection.

FIG. 1 illustrates a conventional UPnP telephony system, which includes a telephony service provider 101, an UPnP telephony control point (or a control point) 102, a telephony server (or terminal) 103, and telephony client (or electronic device) 104.

Herein, the telephony terminal 103 and the electronic device 104 are located in a space in which they can communicate with the control point 102 by using the UPnP protocol.

The telephony service provider 101 provides both a telephony service and an interface for transmitting and receiving calls to the telephony terminal 103.

The control point 102 is a logical software module for controlling a UPnP telephony server 106 and a UPnP telephony client 109 by using a UPnP action. Although the control point 102 may be provided in a device such as a Personal Computer (PC) or a Personal Digital Assistant (PDA), separately from the telephony terminal 103 and the electronic device 104, it may also be provided in a physical device such as the terminal telephony 103 or the electronic device 104, in which case the control point 102 may directly control the UPnP telephony server 106 or the UPnP telephony client 109 without using a UPnP action.

The control point 102 determines a media, protocol, and transmission format to be used for call transmission and reception by using capability information of a call data transmission agent, which is transmitted from the UPnP telephony server 106 and is included in the UPnP telephony server 106 or the UPnP telephony client 109. The control point 102 generates a profile in which the determined media, protocol, and transmission format are defined, and transmits the profile to the UPnP telephony server 106 or the UPnP telephony client 109, thereby setting the environment of the call data transmission agent included in the telephony terminal 103 or the electronic device 104.

The telephony terminal 103 is a physical device, such as a CE device, a telephone, a PC including VoIP configured with software, or a mobile communication terminal interworking over a communication network. The telephony terminal 103 includes the UPnP telephony server 106 configured with software, and controls call transmission and reception by using the telephony service provider 101 for providing a telephony service and an interface provided by the telephony service provider 101.

The electronic device 104 is a physical device, such as a CE device, a PC or a TV capable of inputting and outputting voice or an image of a user, or a mobile communication terminal or a video phone, and includes the UPnP telephony client 109 configured with software. As such, a user can conveniently transmit and receive a call in home by using a home network system.

FIG. 2 illustrates a situation in which users perform video communications by using UPnP telephony in their respective homes.

In FIG. 2, Bob and Alice perform cell phone video communications by using CE devices, such as TVs, as video and voice input/output devices in their homes. The TV includes a video input device such as a camcorder, and an image input through the camcorder is transmitted to a third-generation (3G)/Long Term Evolution (LTE) network through a cell phone. A cell phone 201 of Alice, which has received the image, transmits the received image to a TV 200 to display the image of Bob. In the same manner, an image of Alice is transmitted to a TV 203 of Bob.

When a conventional technology based on UPnP telephony is used, image traffics transmitted over the 3G/LTE network has limited quality based on an allowed bandwidth between mobile phones.

The image traffic is specialized for use in cell phones and thus has low image resolution, and the bandwidth of the 3G/LTE network is not large, thus rendering likely a phenomenon such as image disconnection.

Since a TV has a larger display size than a cell phone, image enlargement is required to see a low-definition image on the TV. When the low-definition image is enlarged, the image may be distorted or blurred.

Conventionally, only a video stream is supported to the extent supported by a telephony server, regardless of the maximum performance of a telephony client to be used by the user.

In case of communication between a TV and a cell phone, a user of the cell phone can see a video call screen, but a user of the TV inconveniently sees an enlarged low-definition image.

Such a problem is aggravated when both users use TVs. Even if the problem were solved, transmission of an HD image would be impossible without an improvement to the 3G/LTE network that transmits a video stream of the video communication.

Moreover, the foregoing image distortion may be experienced when both users perform communication by using TVs having embedded UPnP telephony technologies.

When a field of a Session Initiation Protocol (SIP) is extended to find out information of a home network to which a peer cell phone belongs and to partially set a function of a peer TV, phones of both users, which have embedded SIP User Agents (UAs) therein, may transmit information by using an additional field of the SIP. However, when only a conventional mobile network is supported, the information cannot be transmitted. Further, if a field is newly defined in an SIP body, a conventional SIP server would filter and remove the field.

SUMMARY OF THE INVENTION

Accordingly, an aspect of the present invention is to provide an apparatus and method for providing the same user experience as in conventional telephony, which receives a call through a cellular phone and selects a device for performing communication, and concurrently providing HD video communication.

According to an aspect of the present invention, there is provided an apparatus for configuring an HD call connection between computer devices, the apparatus including a Short Messaging Service (SMS)—transceiving module for receiving an SMS device list information request message for requesting telephony device list information regarding a home network of a first device from the first device, discovering a device in the home network according to the received SMS device list information request message to generate the telephony device list information, transmitting an SMS device list information response message including the generated telephony device list information to the first device, receiving an SMS call connection request message for requesting a call connection from the first device, and transmitting an SMS call connection response message with respect to the SMS call connection request message to the first device, and a Control Point (CP) for selecting a telephony device for receiving the call, transmitting a request for call start to the selected telephony device, and receiving a response for call start from the selected telephony device.

According to another aspect of the present invention, there is provided an apparatus for configuring an HD call connection between computer devices, the apparatus including an SMS transmission/reception module for generating an SMS device list information request message for requesting telephony device list information regarding a home network of a second device to transmit the generated SMS device list information request message to the second device, receiving an SMS device list information response message comprising the telephony device list information from the second device, transmitting an SMS call connection request message for requesting a call connection to the second device, and an SMS call connection response message with respect to the SMS call connection request message from the second device, and a CP for processing a call connection between a telephony device of the first device and its telephony device as a single session.

BRIEF DESCRIPTION OF THE DRAWINGS

The above and other aspects, features and advantages of embodiments of the present invention will be more apparent from the following detailed description taken in conjunction with the accompanying drawings, in which.

DETAILED DESCRIPTION OF EMBODIMENTS OF THE PRESENT INVENTION

Figure 1:
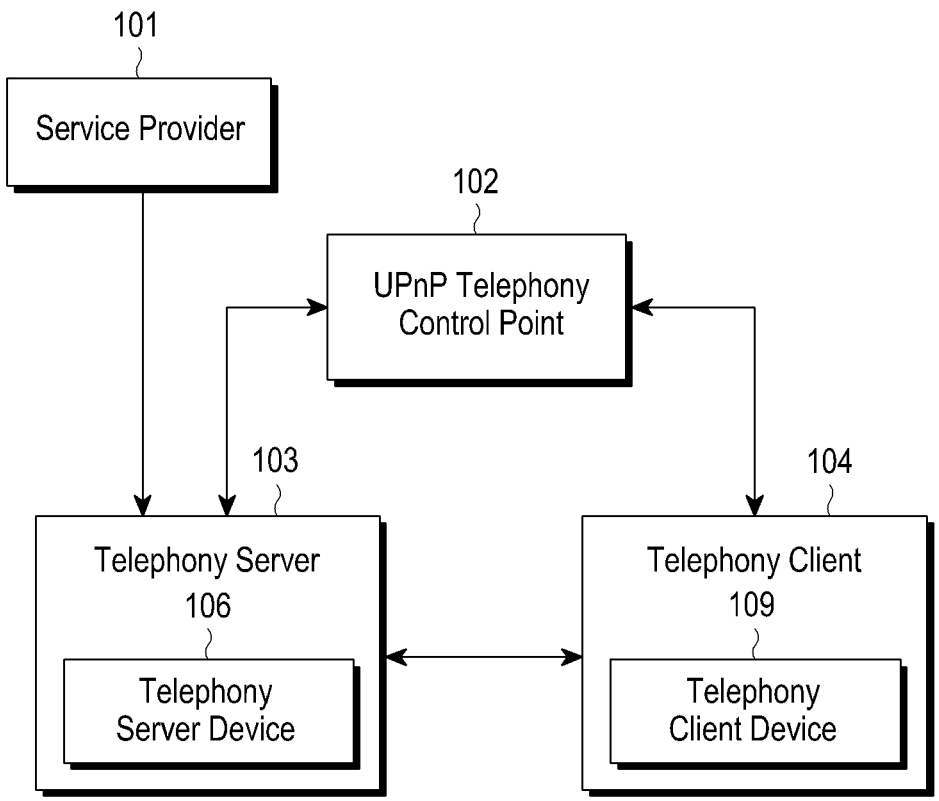
FIG. 1 illustrates a conventional UPnP telephony system.
Figure 2:
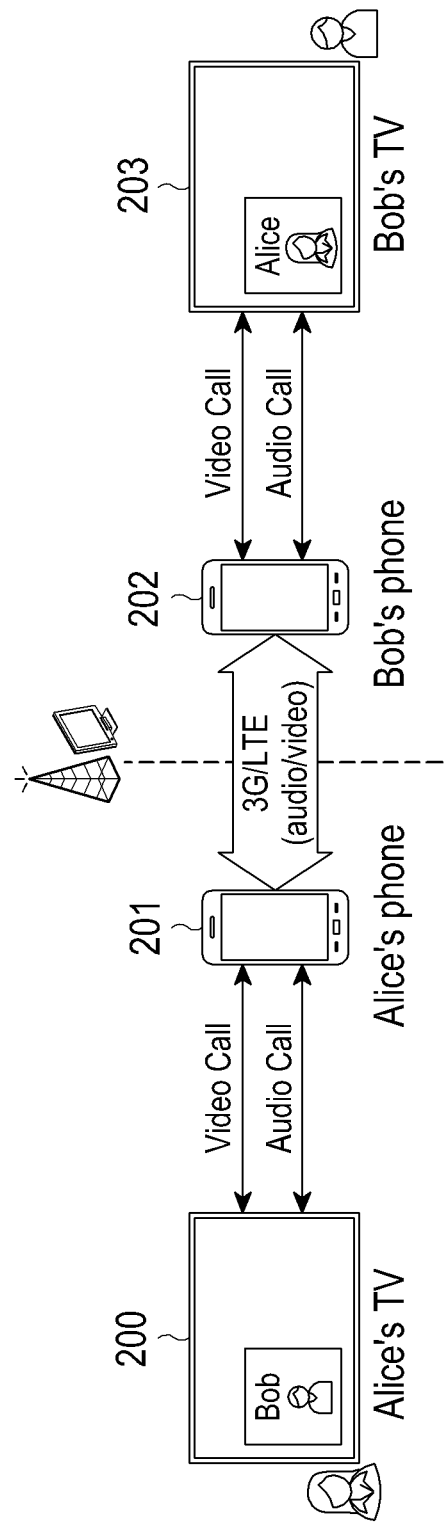
FIG. 2 illustrates a process of performing video communication by using a conventional UPnP telephony technique.

Hereinafter, embodiments of the present invention will be described in detail with reference to the accompanying drawings. In the following description and the accompanying drawings, well-known functions and structures will not be described if they unnecessarily obscure the subject matter of the present invention. Further, a detailed description of known functions and configurations incorporated herein will be omitted for the sake of clarity and conciseness.

A home network generally includes an IP-based private network and controls various devices of any type, used in home, such as a PC, an intelligent product, and a wireless device, by connecting them over a single network through a common virtual computing environment referred to as middleware.

The middleware connects various digital devices in a peer-to-peer manner to allow communication therebetween. Examples are Home Audio/Video Interoperability (HAVI), UPnP, Java Intelligent Network Infra-structure (Jini), and Home Wide Web (HWW).

In a computing environment established through the UPnP middleware, each device is allocated an address from a server according to a Dynamic Host Configuration Protocol (DHCP) or an address selected by an automatic IP designation function, and performs communication with another device and search/inquiry on the network.

An UPnP network is a home network technique that is most widely used at present, and defines a UPnP device and service and a protocol therebetween. The UPnP network includes a Controlled Device (CD) which is a home network device connected to and controlled by an IP-based home network, and a Control Point (CP) which is a device for controlling the CD and requesting and receiving an event. The CD performs a predefined function according to a request of the CP, such that the CD transmits an event to the CP which requests the event if the state of the CD is changed.

Operating processes in respective steps between devices of the conventional UPnP network include advertisement, discovery, description, control, and eventing processes.

In the advertisement process, a new CD is connected to a home network such that the new CD advertises itself to other devices on the home network. In the discovery process, a new CP is connected to a home network, such that the new CP searches CDs operating on the home network. In the description process, to control a CD, a CP recognizes a newly added device function in detail by parsing a service description Extensible Markup Language (XML) file or a device description XML file through an IP address of the CD, obtained in the discovery process. In the control process, when a CP desires to provide a particular service through a CD, the CP transmits an action request for requesting the service to the CD by using a Simple Object Access Protocol (SOAP) according to a UPnP device architecture and receiving a response message (result, variable value) to the action request. The eventing process involves checking a change state of information of the CD that provides the service according to a control command transmitted from the CP.

Figure 3:
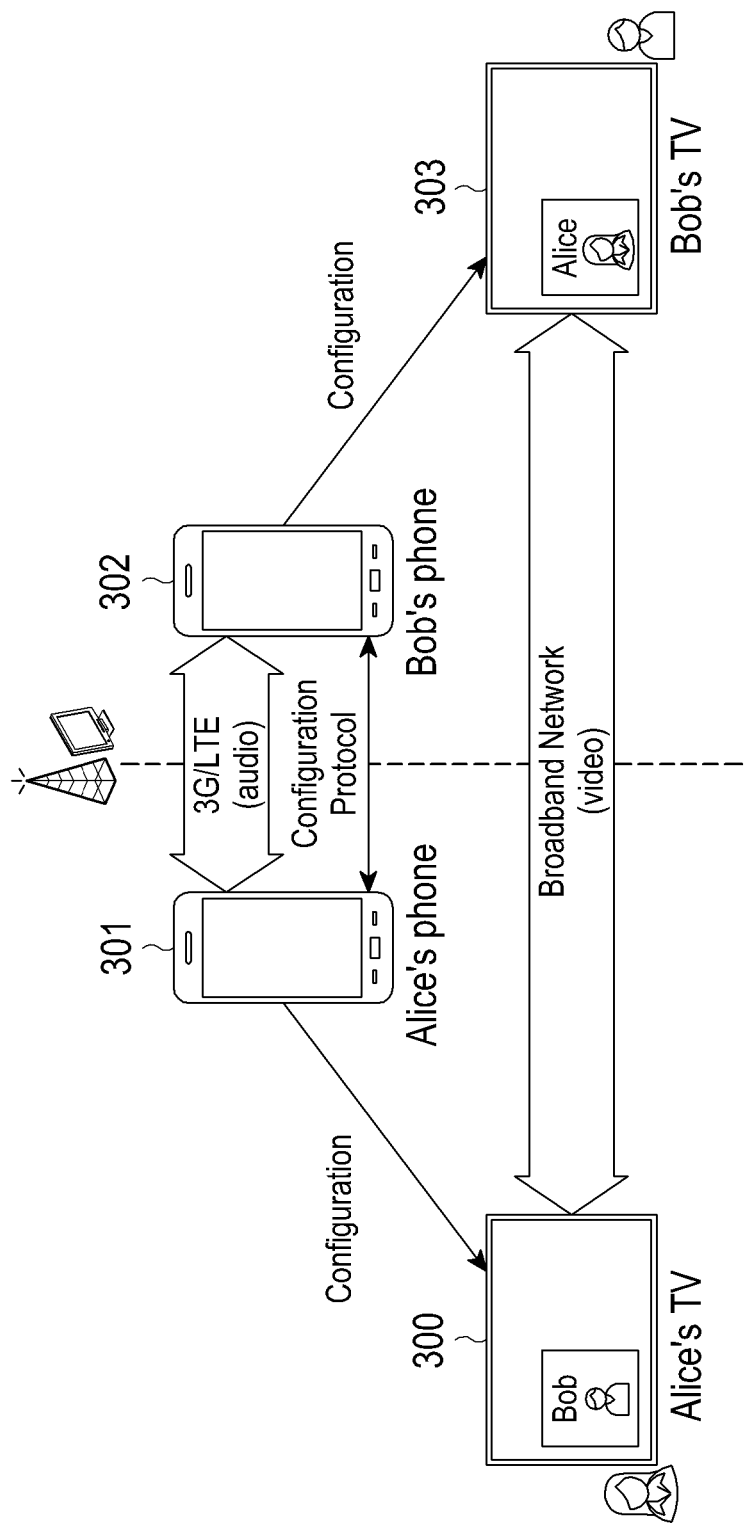
FIG. 3 illustrates a UPnP system according to a first embodiment of the present invention.

FIG. 3 illustrates a UPnP system for configuring HD video telephony between computer devices, according to a first embodiment of the present invention.

A user connects to a cellular phone or a VoIP terminal by using a TV having embedded UPnP telephony therein and performs communication with a communication peer, and the communication peer also receives a call through a TV using UPnP telephony.

In this situation, an Alice's TV 300 or an Alice's phone 301 recognizes through a configuration protocol that a telephony device is connected to a peer's phone. When it becomes certain that both users are using telephony, Alice's TV 300 or phone 301 requests information for accessing the peer's TV and, upon receiving the access information, directly connects to Bob's TV 303 by using the access information.

When those two phones perform communication over a 3G/LTE network, information of a home network to which the peer's phone belongs can be acquired through a configuration protocol by using a data network. However, when Alice's TV 300 or phone 301, which does not know information for accessing the peer, desires to connect to the peer over the data network, it has to know an Identification (ID) of the peer and at present, there is no way to transmit the ID.

Figure 4:
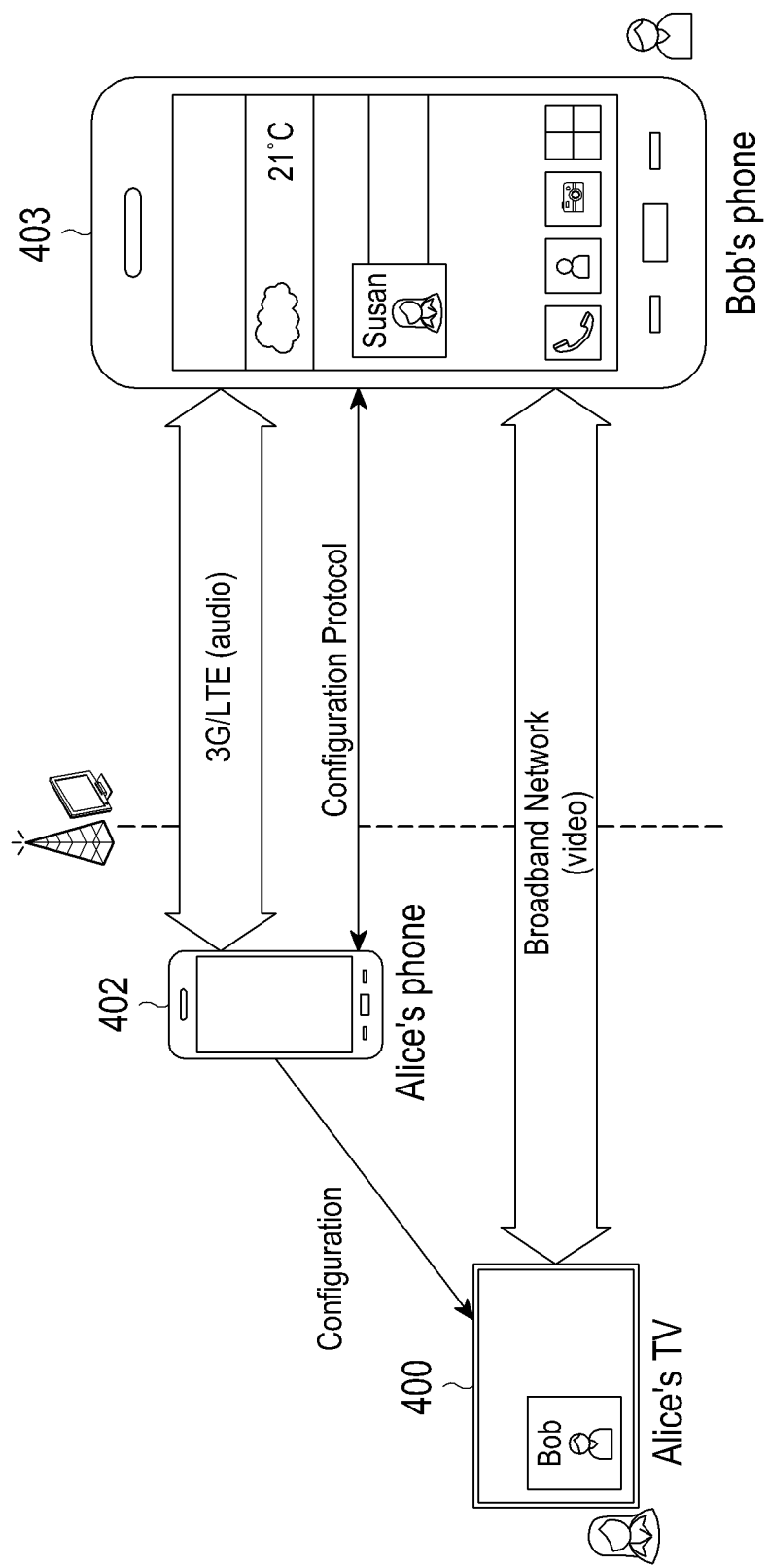
FIG. 4 illustrates a UPnP system according to a second embodiment of the present invention.

FIG. 4 illustrates a UPnP system for configuring HD video telephony between computer devices, according to a second embodiment of the present invention.

A user performs communication with a peer by connecting to a cell phone or a VoIP terminal using a TV having embedded UPnP telephony therein, but the peer performs communication through his or her terminal without using UPnP telephony.

In this situation, when Bob's cell phone 402 and Alice's TV 400 are connected with a broadband network through WiFi, an HD image may be transmitted by using the same method as disclosed in FIG. 3.

In this case, the cell phone may receive and transmit an image of a better quality than an image suitable to be reproduced therein.

Figure 5:
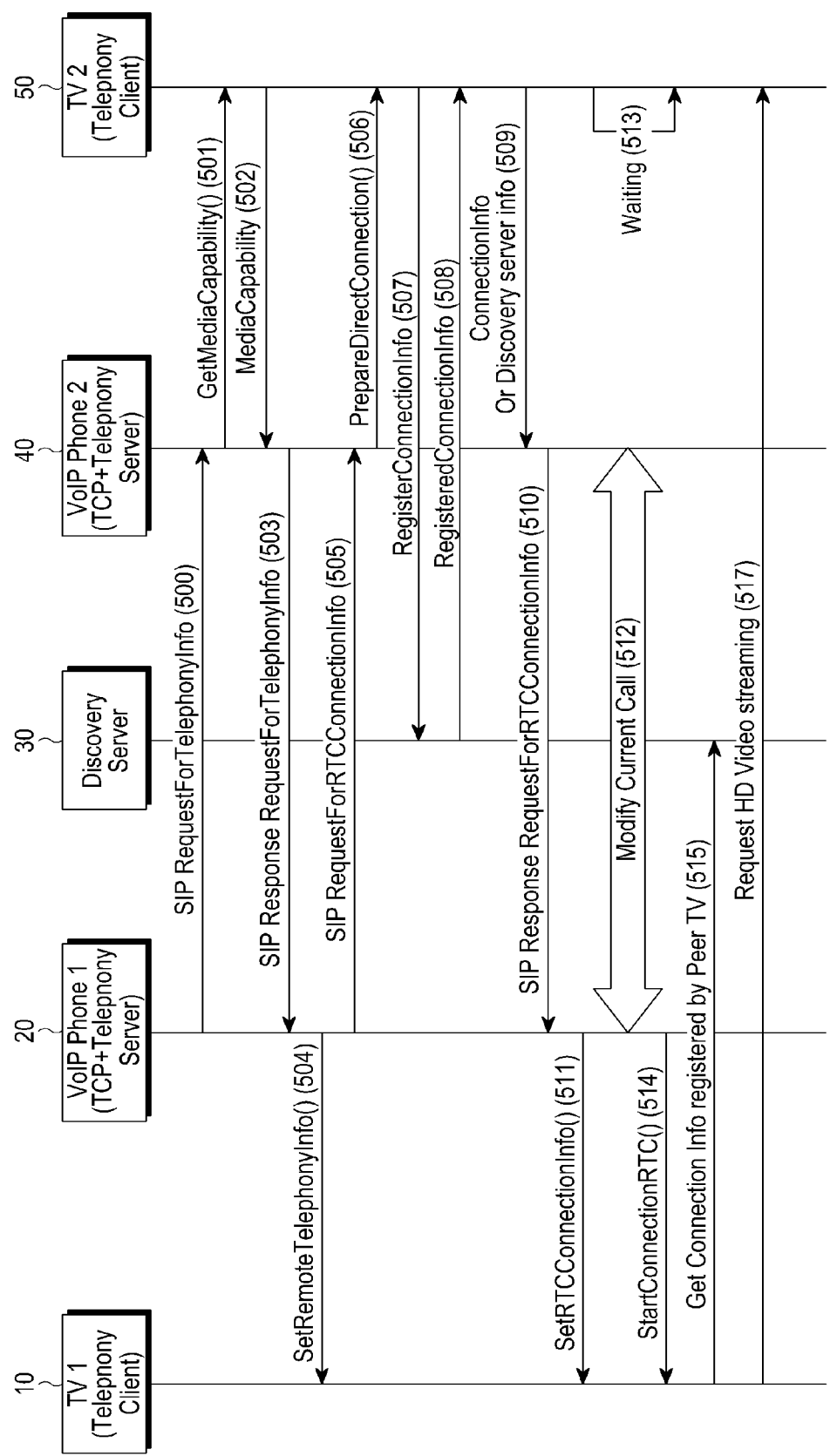
FIG. 5 illustrates a process of configuring HD video telephony between computer devices in an UPnP system according to the present invention.

FIG. 5 illustrates a process of configuring HD video telephony between computer devices in a UPnP system according to the present invention.

It is assumed that in the UPnP telephony system, each user uses a TV and a VoIP phone to which UPnP telephony is applied.

In FIG. 5, two users currently perform video communication by using a VoIP phone #1 20 and a VoIP phone #2 40.

Although the VoIP phone #1 20 and the VoIP phone #2 40 include UPnP telephony CPs in FIG. 5, the telephony CPs are logical modules and thus may also be implemented in a TV #1 10 or a TV #2 50. In this case, the order of information request and response, and a request method, may be changed.

Referring to FIG. 5, in step 500, the VoIP phone #1 20 transmits a request for telephony client information to the VoIP phone #2 40 by using an option field of an SIP.

In steps 501 through 503, the VoIP phone #2 40 calls GetMediaCapability( ) defined in UPnP telephony v1.0 to find out media capability information (MediaCapability) of a telephony client, and transmits the media capability information to the VoIP phone #1 20. Thereafter, in step 504, the VoIP phone #1 20 transmits the media capability information of the telephony client to the TV #1 10.

If a peer has a telephony client capable of transmitting and receiving an HD video call, the VoIP phone #1 20 transmits a request for information for accessing a telephony client of the peer to the VoIP phone #2 40 of the peer in step 505. In step 506, the VoIP phone #2 40 prepares for connection to the TV #2 50.

In steps 507 through 510, the TV #2 50 may indicate a method for connecting to the TV #2 50 by using two methods.

First, the TV #2 50 may generate access information, such as an IP and a port, which allows access to the TV #2 50, or registers information for accessing the TV #2 50 in an external server and provides information about the external server.

The first method may be performed through the external server such as a Simple Traversal of User Data Protocol (UDP) over Network Access Translations (NATs) (STUN) server. When the TV #1 20 transmits a request to an external STUN server, the STUN server transmits an IP and a port of a requesting network device to the TV #1 20 through a response.

When a gateway device exists in a home network to which the TV #2 50 belongs, the TV #2 50 may access the gateway from outside by using the foregoing method to find out an IP and a port for accessing the TV #2 50. Thereafter, the TV #2 50 transmits the foregoing information to the TV #1 20. In this manner, the TV #1 20 can directly access the TV #2 50.

The second method is using an external relay server. The TV #2 50 accesses an external discovery server 30 to register an IP and a port for accessing the TV #2 50. The registered IP and port are of the discovery server 30.

The TV #2 50 transmits access information from which the registered information can be acquired to the TV #1 20, which accesses the discovery server 30 based on the access information to transmit and receive an image, and the discovery server 30 relays the image to the TV #2 50. Herein, among NATs of the gateway, there is a NAT which cannot be initiated from outside, and thus when such an NAT is used, the second method may be adopted.

After the access information of the TV #2 50 is acquired through the foregoing method, the VoIP phone #1 20 transmits the access information to the TV #1 10 in step 511 and modifies existing video communication to voice communication in step 512. In step 513, the TV #2 50 waits for a connection with the TV #1 10.

In steps 514 through 517, the TV #2 50 exchange moving images with the TV #1 10, and CPs of the VoIP phones #1 20 and the VoIP phone #2 40 group a voice communication and a video communication to process them as a single session.

Figure 6:
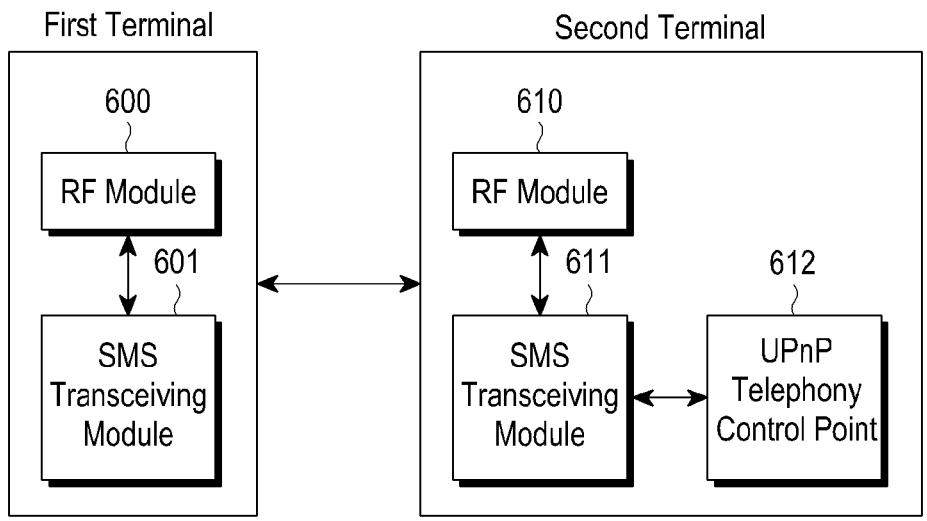
FIG. 6 illustrates a UPnP system for transmitting and receiving information of a terminal by using an SMS, according to the present invention.

FIG. 6 illustrates a UPnP system for transmitting and receiving information of a terminal by using an SMS, according to the present invention.

In FIG. 6, a first terminal may include a Radio Frequency (RF) module 601 and an SMS transmission/reception (transceiving) module 601, and a second terminal may include an RF module 610, an SMS transceiving module 611, and a UPnP telephony CP 612. In FIG. 6, a user of the first terminal performs communication through a cell phone. The user and the user's cell phone know only a phone number of the second terminal, among peer IDs. Thus, the user of the first terminal has to discover and control a device of a peer home network in a manner to transmit and receive information by using the phone number of the second terminal.

An SMS is currently provided in virtually any cell phone, and can directly transmit a text by using the peer's phone number. The user of the first terminal may request an ID of the second terminal, such as an SIP Uniform Resource Locator (URL) by using the SMS, and may discover and control a UPnP device of a network of the second terminal by using a newly received ID in the same manner as an I-ID video call using UPnP telephony.

Instead of discovering the peer's ID by using the SMS, the user may request discovery of a device, control the discovered device, and receive a device list and a device control event.

Components shown in FIG. 6 will be described in more detail below.

First, the RF module 600 of the first terminal performs data transmission and reception for general wireless communication.

The SMS transceiving module 601 of the first terminal generates an SMS request message for requesting discovery of a UPnP device of the network of the second terminal, and transmits the generated SMS request message to the second terminal by using a phone number of the second terminal.

The SMS transceiving module 601 of the first terminal receives SMS response message including device list from the second terminal, and transmits SMS control command message including device control command for controlling the UPnP device in the device list to the first terminal The RF module 610 of the second terminal performs a similar operation to that of the RF module 600 of the first terminal, to perform data transmission and reception for general wireless communication of the second terminal.

The SMS transceiving module 611 of the second terminal, upon receiving an SMS request message for requesting the discovery of the UPnP device of the network of the second terminal from the first terminal, generates an SMS response message including the device list of the UPnP device of the network of the second terminal and transmits the SMS response message to the first terminal.

The SMS transceiving module 611 of the second terminal receives SMS control command message including device control command from the first terminal.

The UPnP telephony CP 612 of the second terminal discovers an UPnP device in network of the second terminal and generates the device list of the discovered UPnP device. And then the UPnP telephony CP 612 of the second terminal, upon receiving the SMS control command message for controlling the UPnP device from the first terminal, controls the UPnP device according to the SMS control command message.

Figure 7:
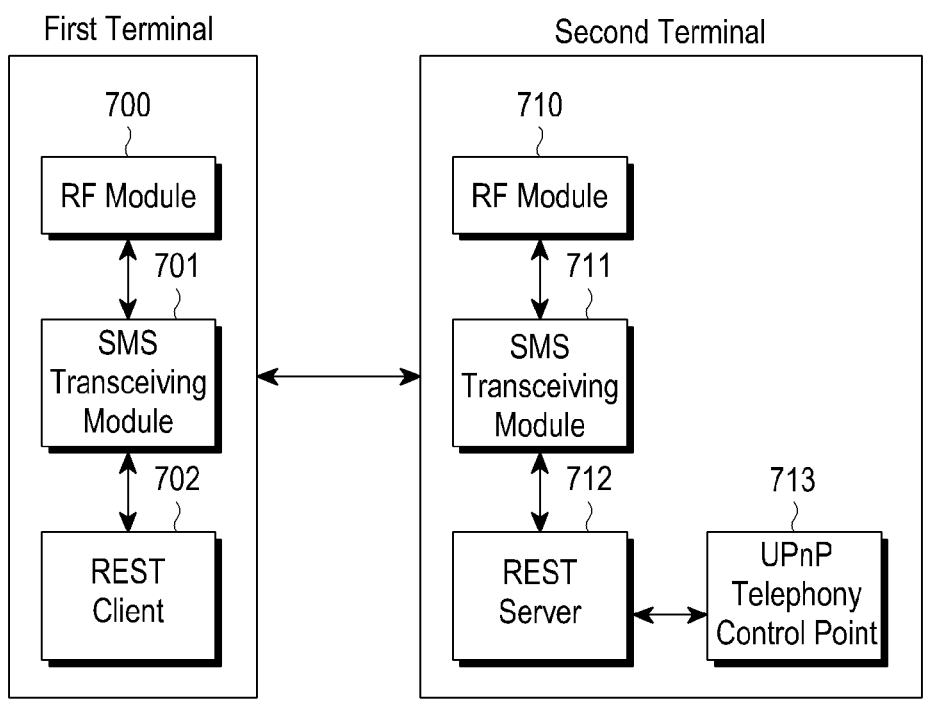
FIG. 7 illustrates a UPnP system for transmitting and receiving terminal information by using a REST-format message, according to the present invention.

FIG. 7 illustrates a UPnP system for transmitting and receiving terminal information by using a REST-format message, according to the present invention.

A cell phone used by a user includes a module capable of transmitting to and receiving from a peer an SMS message, and a REST server, which is a type of Hypertext Transfer Protocol (HTTP) server. Thus, the user's cell phone may discover and control a device of a peer home network or exchange information with the device, by using a message in a REST format instead of an SMS message.

To exchange the REST message, an IP address of the cell phone having embedded the REST server therein is required and the IP address may be exchanged through the SMS or by a server that supports an address book on the network.

Components shown in FIG. 7 will be described in more detail below.

First, an RF module 700 of a first terminal performs data transmission and reception for general wireless communication.

An SMS transceiving module 701 of the first terminal generates an SMS request message for requesting an ID, such as IP address or URI of the REST server, of a call-connected second terminal, and transmits the generated SMS request message to the second terminal by using a phone number of the second terminal.

Upon receiving the second terminal's ID from the second terminal, a REST client 702 of the first terminal requests discovery of a UPnP device of a network of the second terminal by using the received second terminal's ID, and receives a device list according to request from the second terminal.

The REST client 702 transmits device control command for controlling the UPnP device in the device list according to request of device control to the second terminal.

An RF module 710 of the second terminal performs a similar operation to that of the RF module 700 of the first terminal, such that the RF module 710 performs data transmission and reception for general wireless communication of the second terminal.

An SMS transceiving module 711 of the second terminal, upon receiving an SMS message for requesting an ID of the second terminal from the first terminal, generates an SMS response message including the second terminal's ID and transmits the generated SMS response message to the first terminal.

A REST server 712 of the second terminal, upon receiving a request for discovery of a UPnP device from the first terminal, transmits a device list generated according to request to the first terminal.

The REST server 712 of the second terminal receives the device control command from the first terminal.

A UPnP telephony CP 713 of the second terminal discovers an UPnP device in network of the second terminal and generates the device list of the discovered UPnP device. And then the UPnP telephony CP 713 of the second terminal, upon receiving the SMS control command for controlling the UPnP device from the first terminal, controls the UPnP device according to the SMS control command.

Figure 8:
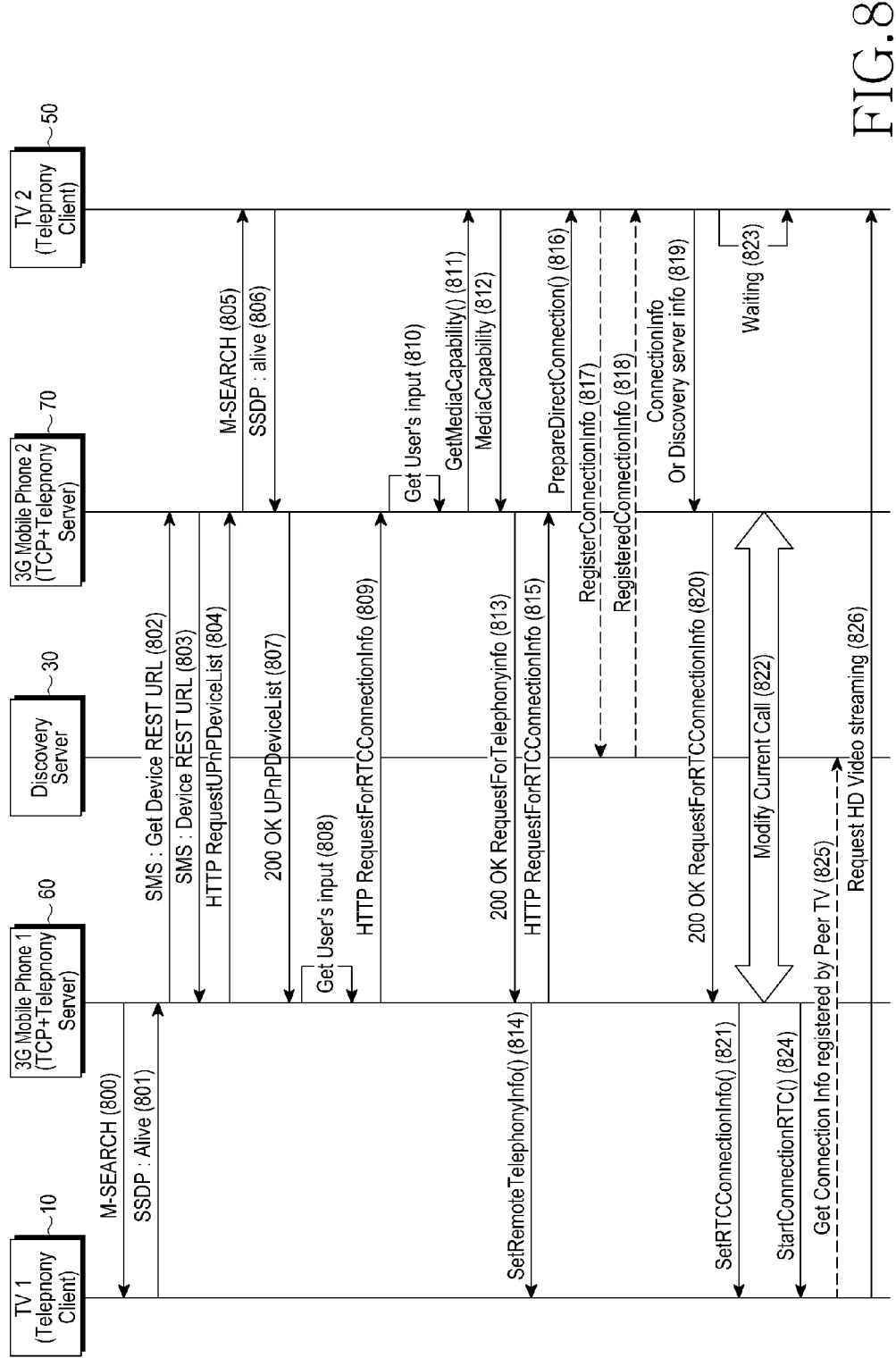
FIG. 8 illustrates a process of communicating an IP address of an initial REST Server through an SMS and then communicating UPnP telephony related information of a peer home network by using a REST message, according to the present invention.

FIG. 8 illustrates a process of communicating an IP address of an initial REST Server through the SMS and then communicating UPnP telephony related information of a peer home network by using a REST message, according to the present invention.

It is assumed that a home network of each user includes a TV and a 3G mobile phone to which UPnP telephony is applied.

It is also assumed that two users currently perform video communication by using a 3G mobile phone #1 60 and a 3G mobile phone #2 70.

Although the 3G mobile phone #1 60 and the 3G mobile phone #2 70 are assumed to have UPnP telephony CPs in FIG. 8, the CPs are logical modules and thus may be implemented in a TV #1 10 or a TV #2 50. In this case, the order of information request and response, and a request method, may be changed.

In steps 800 and 801, the 3G mobile phone #1 60 discovers a telephony device of a home network to which it currently belongs, by using an embedded Telephony CP (TelCP).

In step 802, the 3G mobile phone #1 60 requests an IP address of a REST server at which it can access the 3G mobile phone #2 70, by using an SMS. The 3G mobile phone #1 may also find out a peer's IP by using a Network Address Book service instead of using an SMS. To request and receive the IP, the 3G mobile phone #1 60 may use an SMS message twice, or transmit an IP address of an IP-requesting device through an SMS message for requesting the IP, thereby transmitting its IP information to the received IP address according to the request. In the latter case, the user's burden of communication fees for the SMS can be reduced because the user uses the SMS only once.

In step 803, the 3G mobile phone #2 70 transmits an IP address of its REST server to the 3G mobile phone #1 60 by using an SMS. The 3G mobile phone #2 70 may add the IP of the REST server to an address book to prevent subsequent transmission of an SMS. If the IP of the REST server is changed, the 3G mobile phone #2 70 may respond to an error message and receives the IP through retransmission of an SMS.

In step 804, the 3G mobile phone #1 60 transmits a request for UPnP device list information of a home network of the 3G mobile phone #2 70 to the 3G mobile phone #2 70 by using a REST message.

In steps 805 through 807, the 3G mobile phone #2 70 discovers a UPnP device in its home network by using an M-SEARCH message defined in conventional UPnP Telephony DA 1.1, and transmits the information to the 3G mobile phone #1 60.

An operation of step 807 is a pre-operation for HD video call connection, and subsequent operations are performed after the user operates a device to actually use an HD video call.

In step 809, the 3G mobile phone #1 60 transmits a request for telephony client information of the 3G mobile phone #2 70 to the 3G mobile phone #2 70 by using a REST message, according to a user's input of step 808.

The 3G mobile phone #2 70 having received the user's input according to the request in step 810 calls GetMediaCapability( ) defined in conventional UPnP Telephony v1.0 to find out media capability information (MediaCapability) of a telephony client in step 811, and transmits the media capability information to the 3G mobile phone #1 60 in steps 812 and 813. In this manner, the user of the 3G mobile phone #2 70 may determine whether to permit an HD video call.

If there exists a telephony client capable of transmitting and receiving an HD video call in the 3G mobile phone #2 70, the 3G mobile phone #1 60 transmits a request for information for accessing the telephony client of the 3G mobile phone #2 70 in the same manner as used above, in step 815.

If the access information is requested in step 816, the TV #2 50 may indicate a method for accessing the TV #2 50 by using two methods in steps 817 through 820.

First, the TV #2 50 may generate access information, such as an IP and a port, which allows access to the TV #2 50, or register information for accessing the TV #2 in an external server and provide information about the server as in steps 817 through 819.

The first method indicates access information by using an external server such as a STUN server. When the TV #1 10 transmits a request to an external STUN server, the STUN server indicates an IP and a port of a requesting network device and returns them to the TV #1 10 through a response. When a gateway device exists in a home network to which the TV #2 50 belongs, the TV #2 50 may access the gateway from outside by using the foregoing method to find out an IP and a port for accessing the TV #2 50, which informs the TV #1 10 of the foregoing information, such that the TV #1 10 can directly access the TV #2 50.

The second method involves using an external relay server.

The TV #2 50 accesses an external discovery server to register an IP and a port for accessing the TV #2 50. The registered IP and port are of the discovery server. The TV #2 50 then transmits access information from which the registered information can be acquired to the TV #1 10, which accesses the discovery server based on the access information to transmit and receive an image, and the discovery server relays the image to the TV #2 50. Herein, among NATs of the gateway, there is a NAT which cannot be initiated from outside, and thus when such a NAT is used, the second method may be adopted.

After acquiring the access information of the TV #2 50 through the foregoing method, the 3G mobile phone #1 60 transmits access information to the TV #1 10 in step 821, and modifies existing video communication to voice communication in step 822. In step 823, the TV #2 50 waits for a connection with the TV #1 10.

In steps 824 through 826, the TV #2 50 exchanges moving images with the 3G mobile phone #1 60, and the CP of the 3G mobile phone #1 60 groups voice communication and video communication between the phones to process them as a single session.

Figure 9:
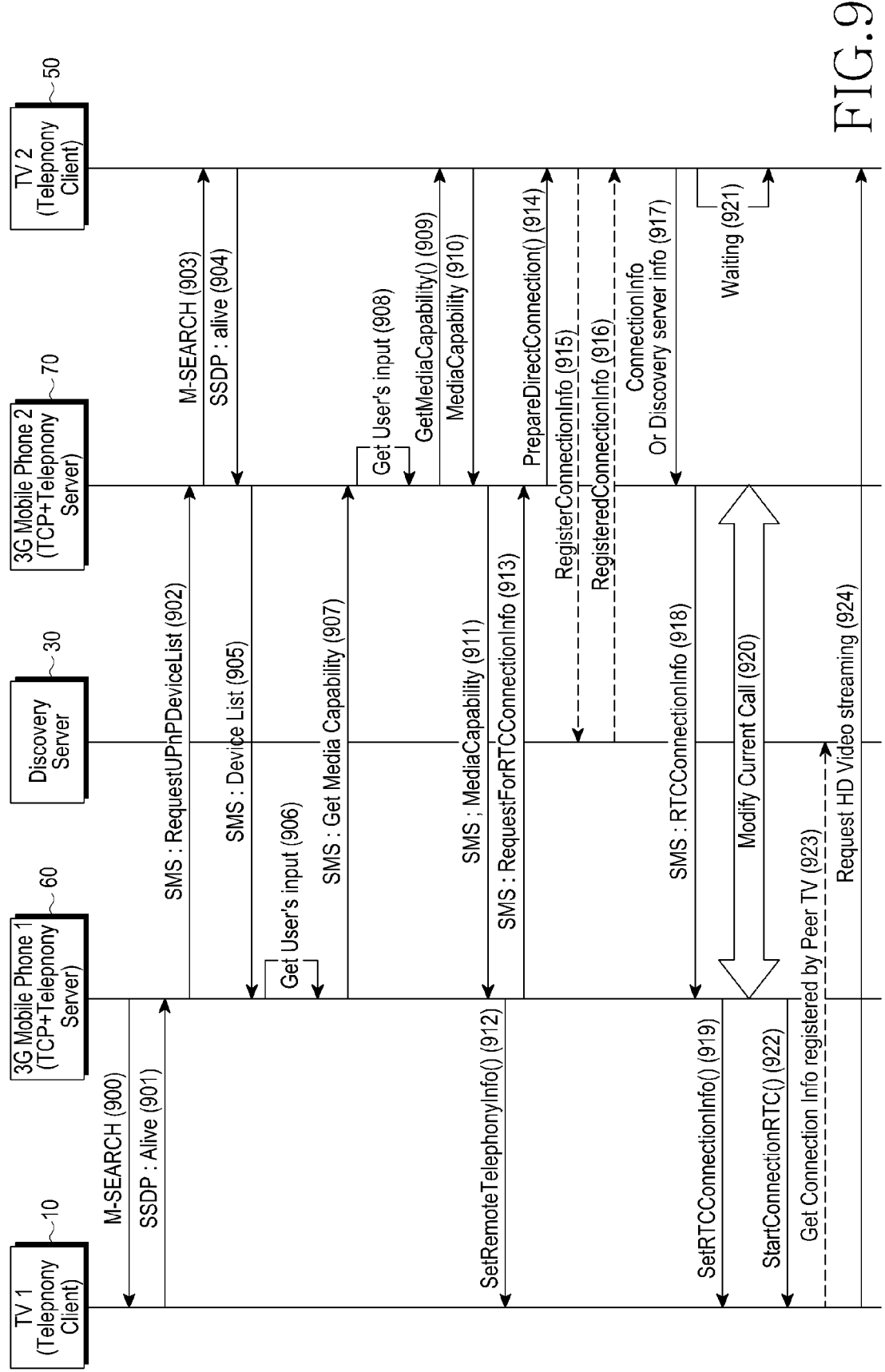
FIG. 9 illustrates a process of communicating home network information of each user and telephony client information through an SMS according to an embodiment of the present invention.

FIG. 9 illustrates a process of communicating home network information of each user and telephony client information through an SMS according to the present invention.

It is assumed that a home network of each user includes a TV and a 3G mobile phone to which UPnP telephony is applied.

It is further assumed that two users currently perform video communication by using a 3G mobile phone #1 60 and a 3G mobile phone #2 70.

Although the 3G mobile phone #1 60 and the 3G mobile phone #2 70 are assumed to have UPnP telephony CPs in FIG. 9, the CPs are logical modules and thus may be implemented in a TV #1 10 or a TV #2 50. In this case, the order of information request and response, and a request method, may be changed.

In steps 900 and 901, the 3G mobile phone #1 10 discovers a telephony device of a home network to which the 3G mobile phone #1 10 currently belongs, by using TelCP embedded therein.

In step 902, the 3G mobile phone #1 60 transmits a request for UPnP device list information of a home network of the 3G mobile phone #2 70 to the 3G mobile phone #2 70 by using an SMS.

In steps 903 through 905, the 3G mobile phone #2 70 having received the request discovers an UPnP device in the home network by using an M-SEARCH message defined in conventional UPnP Telephony DA 1.1, and transmits this information to the 3G mobile phone #1 60.

The operations from step 900 to steps 905 are pre-operations for HD video call connection, and subsequent operations are performed after the user operates a device to actually use an HD video call.

According to a user's input of step 906, the 3G mobile phone #1 60 transmits a request for telephony client information of the 3G mobile phone #2 70 to the 3G mobile phone #2 70 by using an SMS, in step 907. In this manner, the user of the 3G mobile phone #2 70 may determine whether to permit an HD video call.

In steps 909 through 911, the 3G mobile phone #2 70 according to the user in step 908 calls GetMediaCapability( ) defined in conventional UPnP Telephony v1.0 to find out media capability information (MediaCapability) of a telephony client and transmits the media capability information to the 3G mobile phone #1 60.

If there exists a telephony client capable of transmitting and receiving an HD video call in the 3G mobile phone #2 70, the 3G mobile phone #1 60 transmits a request for information for accessing the telephony client of the 3G mobile phone #2 70 in the same manner as used above, in steps 912 and 913.

If the access information is requested in step 914, the TV #2 50 may indicate a method for accessing the TV #2 50 by using two methods in steps 915 through 918.

First, the TV #2 50 may generate access information, such as an IP and a port, which allows access to the TV #2 50, or register information for accessing the TV #2 50 in an external server and provide information about the server as in steps 915 through 917.

The first method indicates access information by using an external server such as a STUN server. When the TV #1 10 transmits a request to an external STUN server, the STUN server indicates an IP and a port of a requesting network device and returns them to the TV #1 10 through a response. When a gateway device exists in a home network to which the TV #2 50 belongs, the TV #2 50 may access the gateway from outside by using the foregoing method to find out an IP and a port for accessing the TV #2 50, which informs the TV #1 10 of the foregoing information, such that the TV #1 10 can directly access the TV #2 50.

The second method involves using an external relay server. The TV #2 50 accesses an external discovery server to register an IP and a port for accessing the TV #2 50. The registered IP and port are of the discovery server. The TV #2 50 then transmits access information from which the registered information can be acquired to the TV #1 10, which accesses the discovery server based on the access information to transmit and receive an image, and the discovery server relays the image to the TV #2 50. Herein, among NATs of the gateway, there is a NAT which cannot be initiated from outside, and thus when such an NAT is used, the second method may be adopted.

After acquiring the access information of the TV #2 50 through the foregoing method, the 3G mobile phone #1 60 transmits access information to the TV #1 10 in step 919, and modifies existing video communication to voice communication in step 920. In step 921, the TV #2 50 waits for a connection with the TV #1 10. In steps 922 through 924, the TV #2 50 exchanges moving images with the 3G mobile phone #1 60, and the CP of the 3G mobile phone #1 60 groups voice communication and video communication between the phones to process them as a single session.

Figure 10:
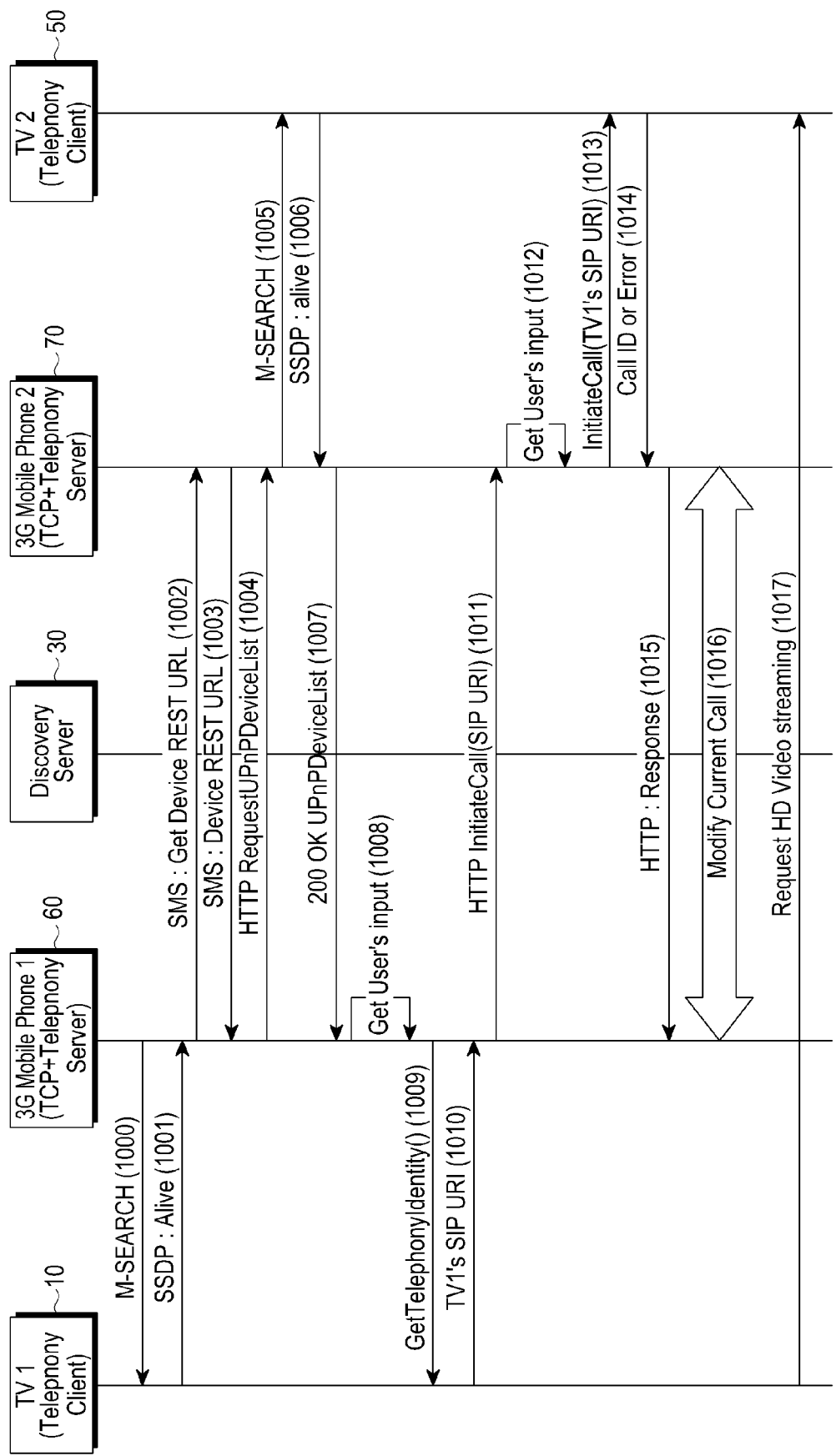
FIG. 10 illustrates a process of communicating an IP address of an initial REST Server and then communicating UPnP telephony related information of a peer home network by using a REST message, according to the present invention.

FIG. 10 illustrates a process of communicating an IP address of an initial REST Server and then communicating UPnP telephony related information of a peer home network by using a REST message according to the present invention.

In FIG. 10, unlike in FIG. 8, a TV is a telephony server capable of sending a call by itself, rather than a telephony client.

The operation of communicating an IP address of an initial REST server through an SMS and the operation of communicating UPnP telephony related information of a peer home network are similar to the operations of FIG. 8.

In steps 1000 and 1001, the 3G mobile phone #1 60 discovers a telephony device of a home network to which it currently belongs, by using an embedded TelCP.

In step 1002, the 3G mobile phone #1 60 requests an IP address of a REST server at which it can access the 3G mobile phone #2 70, by using an SMS. The 3G mobile phone #1 60 may also find out a peer's IP by using a NAB service instead of using an SMS. To request and receive the IP, the 3G mobile phone #1 60 may use an SMS message twice, or transmit an IP address of a requesting device through an SMS message for requesting the IP and then transmit its IP information to the received IP address according to the request. In the latter case, the user's burden of communication fees for the SMS can be reduced because the user uses the SMS only once.

In step 1003, the 3G mobile phone #2 70 transmits an IP address of its REST server to the 3G mobile phone #1 60 by using an SMS. The 3G mobile phone #2 70 adds the IP of the REST server to an address book to prevent subsequent transmission of an SMS. If the IP of the REST server is changed, the 3G mobile phone #2 70 may respond with an error message and receive the IP through retransmission of an SMS.

In step 1004, the 3G mobile phone #1 60 transmits a request for UPnP device list information of a home network of the 3G mobile phone #2 70 to the 3G mobile phone #2 70 by using a REST message. The user of the 3G mobile phone #2 70 may determine whether to permit an HD video call or may make such a determination after step 1101.

The 3G mobile phone #2 70 having received the request discovers a UPnP device in the home network by using an M-SEARCH message defined in conventional UPnP Telephony DA 1.1, and transmits the information to the 3G mobile phone #1 60, in steps 1005 through 1007.

The operations from step 1000 to step 1007 are pre-operations for HD video call connection, and subsequent operations are performed after the user operates a device to actually use an HD video call.

In step 1009, the 3G mobile phone #1 60 transmits a request for an SIP Uniform Resource Identifier (URI) of a premise telephony server, which is to connect an HD video call, according to a user's input of step 1008. Thereafter, the 3G mobile phone #1 60 receives an SIP URI of the TV #1 10 from the TV #1 10 in step 1010, and transmits the SIP URI of the TV #1 10 to the 3G mobile phone #2 70 by using the REST message to initiate the HD video call in step 1011.

In step 1013, the 3G mobile phone #2 70 having received the user's input in step 1012 according to the request selects the premise TV #2 50 which is to receive the call, and transmits Initiatecall( ) to the TV #2 50.

In step 1014, the TV #2 50 transmits a response for initiating the HD video call to the 3G mobile phone #2 60. The response may include a requested call ID for controlling a call, such as call start or call termination, when the call connection is possible, and an error message when the call connection is difficult to perform.

In step 1015, the 3G mobile phone #2 70 transmits the response for initiating the HD video call to the 3G mobile phone #1 60, by using the SMS.

The 3G mobile phone #1 60 having received the response modifies existing video communication into voice communication in step 1016, and the TV #1 10 and the TV #2 50 establishes a session of a video call and then the CP of the 3G mobile phone #1 60 groups voice communication and video communication between the phones to process them as a single session, in step 1017.

Figure 11:
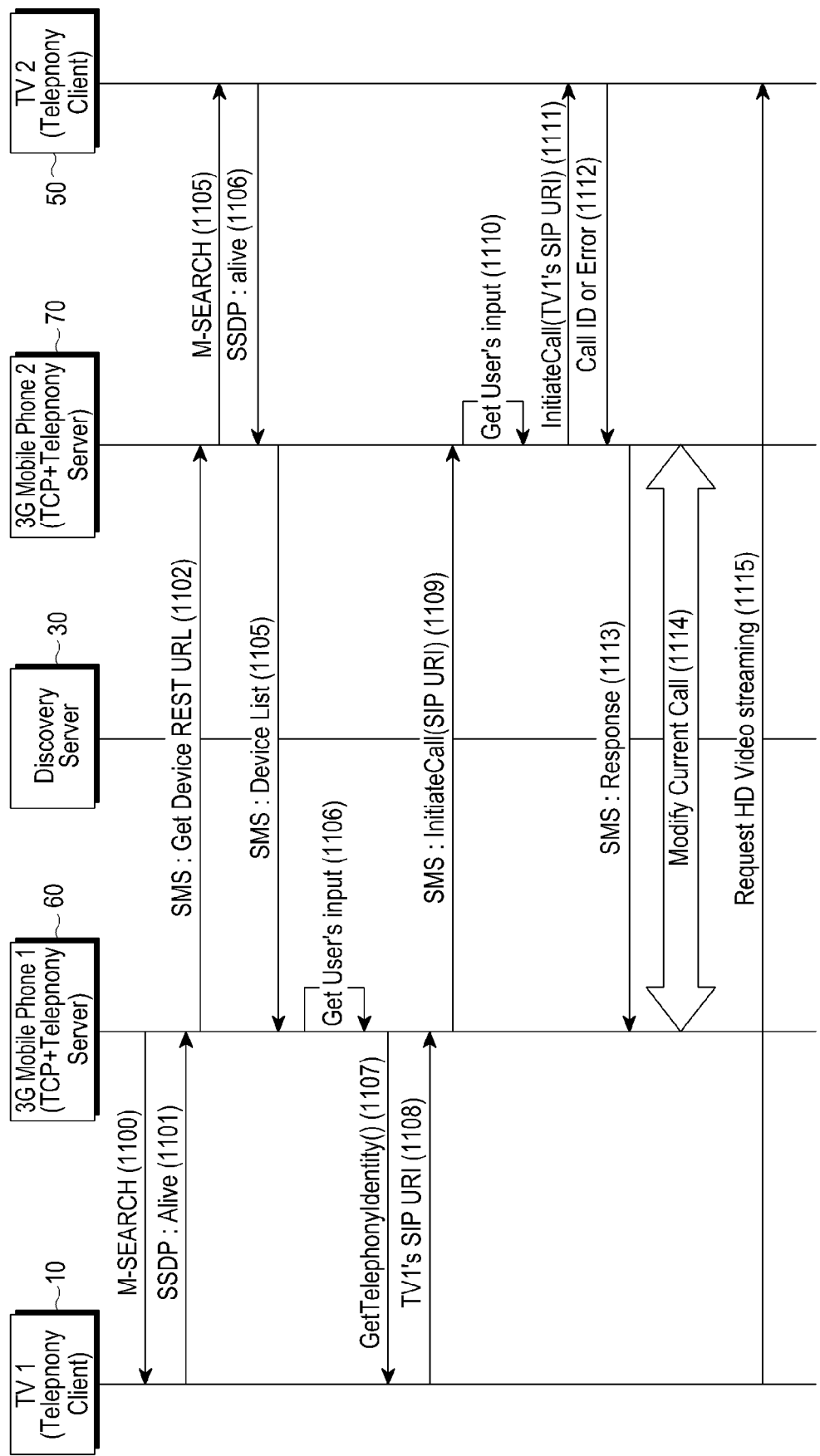
FIG. 11 illustrates a process of communicating home network information of each user, and telephony client information through an SMS according to the present invention.

FIG. 11 illustrates a process of communicating home network information of each user and telephony client information through an SMS according to the present invention.

In FIG. 11, unlike in FIG. 9, a TV is a telephony server capable of sending a call by itself, rather than a telephony client.

In steps 1100 and 1101, a 3G mobile phone #1 60 discovers a telephony device of a home network to which it currently belongs, by using an embedded TelCP.

In step 1102, the 3G mobile phone #1 60 transmits a request for UPnP device list information of a home network of the 3G mobile phone #2 70 to the 3G mobile phone #2 70, by using an SMS. A user of the 3G mobile phone #2 70 may determine whether to permit an HD video call in this stage, or may make a determination after step 1109.

The 3G mobile phone #2 70 having received the request discovers a UPnP device in the home network by using an M-SEARCH message defined in conventional UPnP Telephony DA 1.1 in steps 1103 and 1104, and transmits the information to the 3G mobile phone #1 60 in step 1105. The operations from step 1100 to step 1104 are pre-operations for HD video call connection, and subsequent operations are performed after the user operates a device to actually use the HD video call.

In steps 1107 and 1108, the 3G mobile phone #1 60 transmits a request for an SIP URI of a premise telephony server which is to connect the HD video call and receives the SIP URI from the TV #1 10, according to a user's input of step 1106. Thereafter, in step 1109, by using an SMS, the 3G mobile phone #1 60 transmits the received SIP URI to the 3G mobile phone #2 70.

In step 1111, according to the user's request of step 1110, the 3G mobile phone #2 70 selects the premise TV #2 50 which is to receive the call, and transmits Initiatecall( ) to the TV #2 50.

In step 1112, the TV #2 50 transmits a response for initiating the HD video call to the 3G mobile phone #2 70. The response may include a requested call ID for controlling a call, such as call start or call termination, when the call connection is possible, and an error message when the call connection is difficult to perform.

Thereafter, in step 1113, the 3G mobile phone #2 70 transmits the response for initiating the HD video call to the 3G mobile phone #1 60, by using the SMS.

The 3G mobile phone #1 60 having received the response modifies existing video communication into voice communication in step 1114, and the TV #1 10 and the TV #2 50 establishes a session of a video call, and the CP of the 3G mobile phone #1 60 groups voice communication and video communication between the phones to process them as a single session, in step 1115.

According to the present invention, premise devices may establish a direct channel for transmitting and receiving an HD video call with telephony devices currently in communication.

Conventional UPnP telephony supports the InitiateCall( ) action, but the present invention described above includes a method for providing video streaming between TVs.

Accordingly, a new action, such as EnhancedInitiateCall( ) instead of the conventional InitiateCall( ) action is required, and the EnhancedInitiateCall( ) action may be used in place of InitiateCall( ) in the above description.

The EnhancedInitiateCall( ) action may have parameters such as an SIP URI of a peer to which call connection is to be made, and a call type (callType), and these parameters determine a type of a call to be generated.

The call type parameter is as shown in Table 1.

TABLE 1

```
<?xml version="1.0" encoding="utf-8"?>
<cams:callType
    xsi:schemaLocation="urn:schemas-upnp-org:phone:cams
    http://www.upnp.org/schemas/phone/cams-v1.xsd"
    xmlns:xsi="http://www.w3.org/2001/XMLSchema-instance"
    xmlns:cams="urn:schemas-upnp-org:phone:cams"
    xmlns:peer="urn:schemas-upnp-org:phone:peer">
    <videoCall>
        <resolution>
            <width>1280</width>
            <height>720</height>
        <resolution>
    </videoCall>
    <audioCall>
        <voiceQuality>high</voiceQuality>
    </audioCall>
</cams:callType>
```

In Table 1, a video call (videoCall) and an audio call (audioCall) may be separately set.

For the video call, video quality may be set through detailed setting such as setting of a resolution. Similarly, audio quality may be approximately set for the audio call. The set audio and video qualities are not expressed with standardized specification terms, and symbolically show qualities desired by a user requesting an HD video call. According to these qualities, a device having received EnhancedInitiateCall( ) may arbitrarily determine the video and audio qualities.

The present invention may be equivalently used for a session intended for a purpose other than an HD video call, that is, for session establishment for file exchange and control information exchange. However, in session establishment, a new UPnP action at the same level as InitiateCall( ) mentioned in the foregoing description needs to be defined to set a session type and parameters.

For example, by defining an action for establishing a general-purpose session, such as InitiateSession( ), and adding a manner to describe characteristics of a type of the session to be generated, a session for various purposes may be established.

As is apparent from the foregoing description, a user using VoIP telephony can perform communication with a current communication peer face-to-face through simple manipulation such as by turning on a TV, and in video communication, HD images, which cannot be supported by conventional telephony, can be exchanged.

While the present invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. An apparatus for configuring a High-Definition (HD) call connection between computer devices, the apparatus comprising:
a Short Messaging Service (SMS) transceiving module for receiving, from a second device, an SMS device list information request message for requesting telephony device list information regarding a home network of a first device, transmitting an SMS device list information response message including the telephony device list information to the first device, receiving an SMS call connection request message for requesting a call connection from the first device, and transmitting an SMS call connection response message with respect to the SMS call connection request message to the first device; and
a Control Point (CP) for discovering at least of telephony device in the home network according to the SMS device list information request message, generating the telephony device list information, selecting a telephony device for receiving the call, transmitting a request for call start to the selected telephony device, and receiving a response for call start from the selected telephony device.

2. The apparatus of claim 1, wherein the SMS transceiving module determines whether to permit an HD video call upon receiving the SMS device list information request message.

3. The apparatus of claim 1, wherein the SMS call connection request message is a message for requesting a Session Initiation Protocol (SIP) Uniform Resource Identifier (URI) of the telephony device for the call connection.

4. The apparatus of claim 3, wherein the CP transmits an action for requesting the SIP URI of the telephony device to the telephony device, upon receiving the SMS call connection request message.

5. An apparatus for configuring a High-Definition (HD) call connection between computer devices, the apparatus comprising:
a Short Messaging Service (SMS) transmission/reception module for generating an SMS device list information request message for requesting telephony device list information regarding a home network of a second device to transmit the generated SMS device list information request message to the second device, receiving an SMS device list information response message comprising the telephony device list information from the second device, transmitting an SMS call connection request message for requesting a call connection to the second device, and receiving an SMS call connection response message with respect to the SMS call connection request message from the second device; and
a Control Point (CP) for processing a call connection between a telephony device of the first device and its telephony device as a single session.

6. The apparatus of claim 5, wherein the SMS call connection request message is a message for requesting a Session Initiation Protocol (SIP) Uniform Resource Identifier (URI) of the telephony device for the call connection.

7. The apparatus of claim 5, wherein the CP discovers a telephony device of a home network to which it belongs, and transmits a request for the SIP URI of the telephony device to the discovered telephony device.

8. A method for configuring a high-definition (HD) call connection between computer devices, the method comprising:
receiving an SMS device list information request message for requesting telephony device list information regarding a home network of a first device from the first device;
discovering a device in the home network according to the received SMS device list information request message to generate the telephony device list information;
transmitting an SMS device list information response message comprising the generated telephony device list information to the first device;
receiving an SMS call connection request message for requesting a call connection from the first device; and
transmitting an SMS call connection response message with respect to the SMS call connection request message to the first device;
selecting a telephony device for receiving the call; and
transmitting a request for call start to the selected telephony device, and receiving a response for call start from the selected telephony device.

9. The method of claim 8, wherein the SMS transceiving module determines whether to permit an HD video call upon receiving the SMS device list information request message.

10. The method of claim 8, wherein the SMS call connection request message is a message for requesting a Session Initiation Protocol (SIP) Uniform Resource Identifier (URI) of the telephony device for the call connection.

11. The method of claim 10, wherein the CP transmits an action for requesting the SIP URI of the telephony device to the telephony device, upon receiving the SMS call connection request message.

12. A method for configuring a high-definition (HD) call connection between computer devices, the apparatus comprising:
generating an SMS device list information request message for requesting telephony device list information regarding a home network of a second device to transmit the generated SMS device list information request message to the second device;
receiving an SMS device list information response message comprising the telephony device list information from the second device;
transmitting an SMS call connection request message for requesting a call connection to the second device;
receiving an SMS call connection response message with respect to the SMS call connection request message from the second device; and
processing a call connection between a telephony device of the first device and its telephony device as a single session.

13. The method of claim 12, wherein the SMS call connection request message is a message for requesting a Session Initiation Protocol (SIP) Uniform Resource Identifier (URI) of the telephony device for the call connection.

14. The method of claim 12, wherein the CP discovers a telephony device of a home network to which it belongs, and transmits a request for the SIP URI of the telephony device to the discovered telephony device.

* * * * *